Sept. 30, 1969  S. A. MENCACCI ET AL  3,469,671
HYDROSTATIC COOKER CONVEYOR SYSTEM
Filed April 14, 1967  4 Sheets-Sheet 1
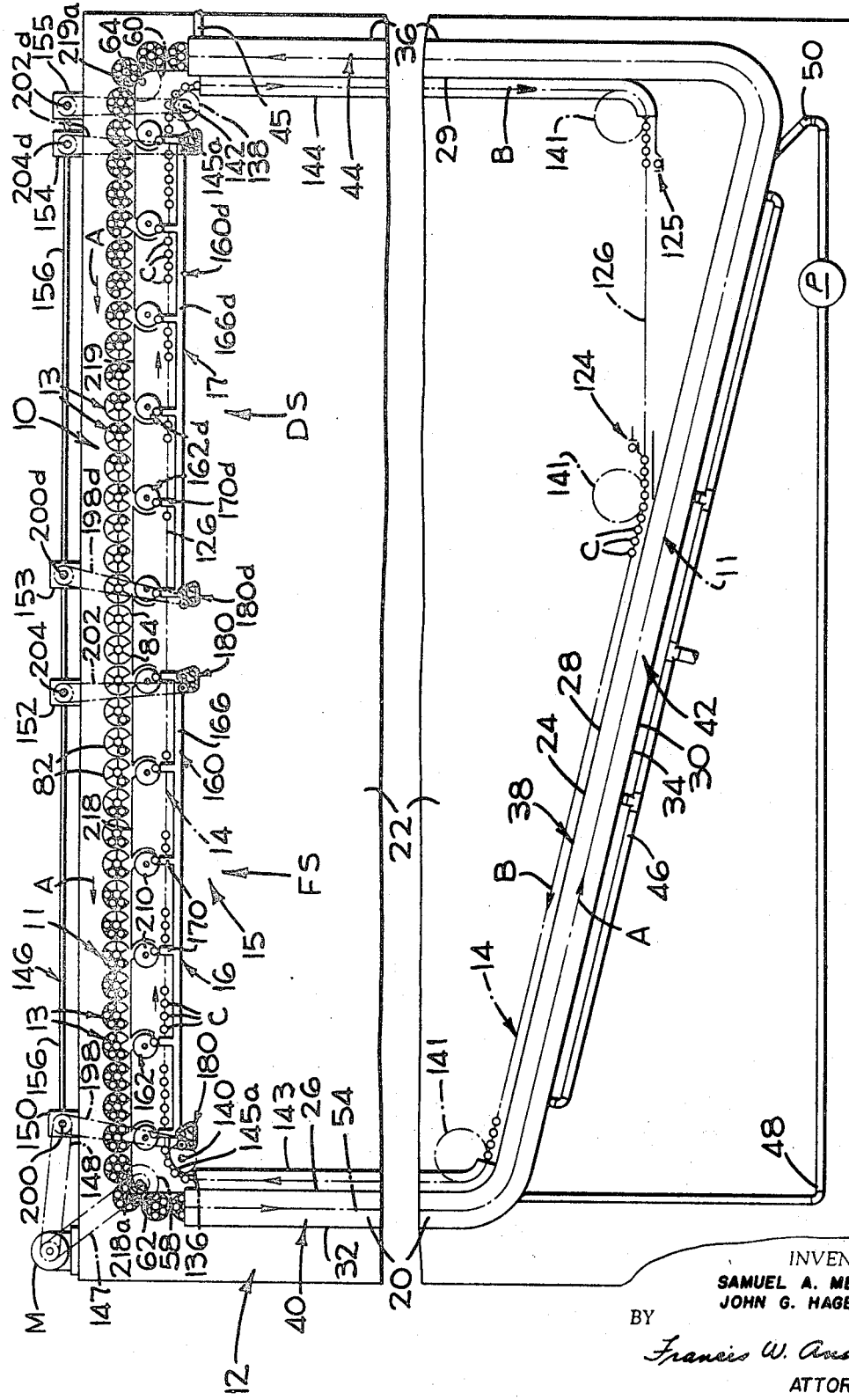
FIG_1
INVENTOR.
SAMUEL A. MENCACCI
JOHN G. HAGERBORG
BY
Francis W. Anderson
ATTORNEY

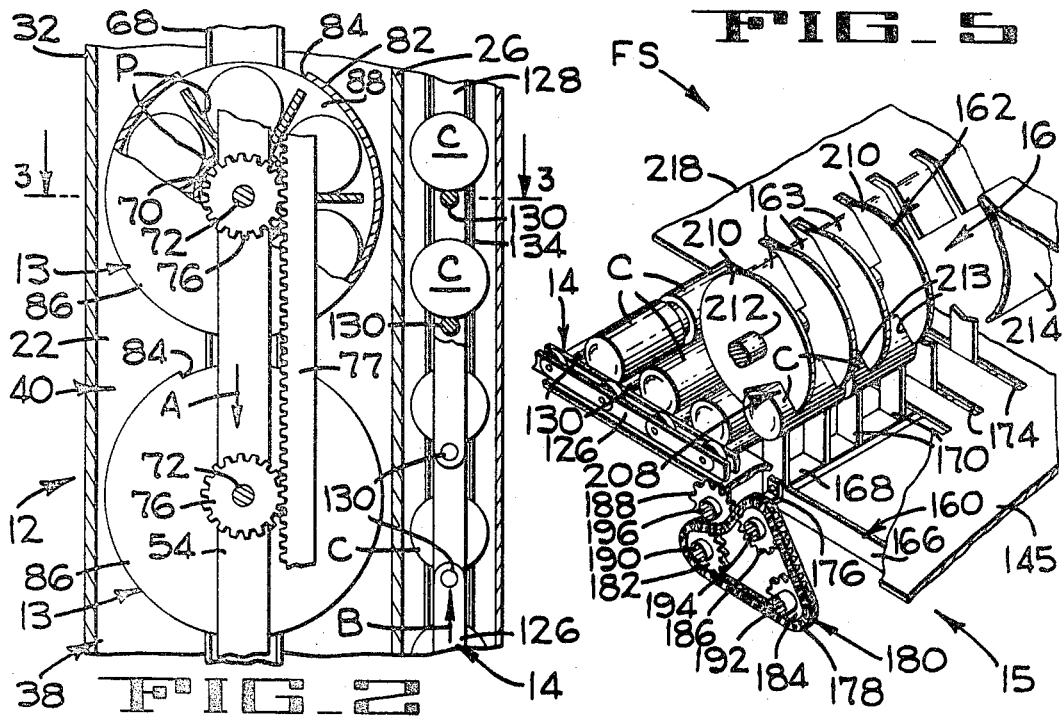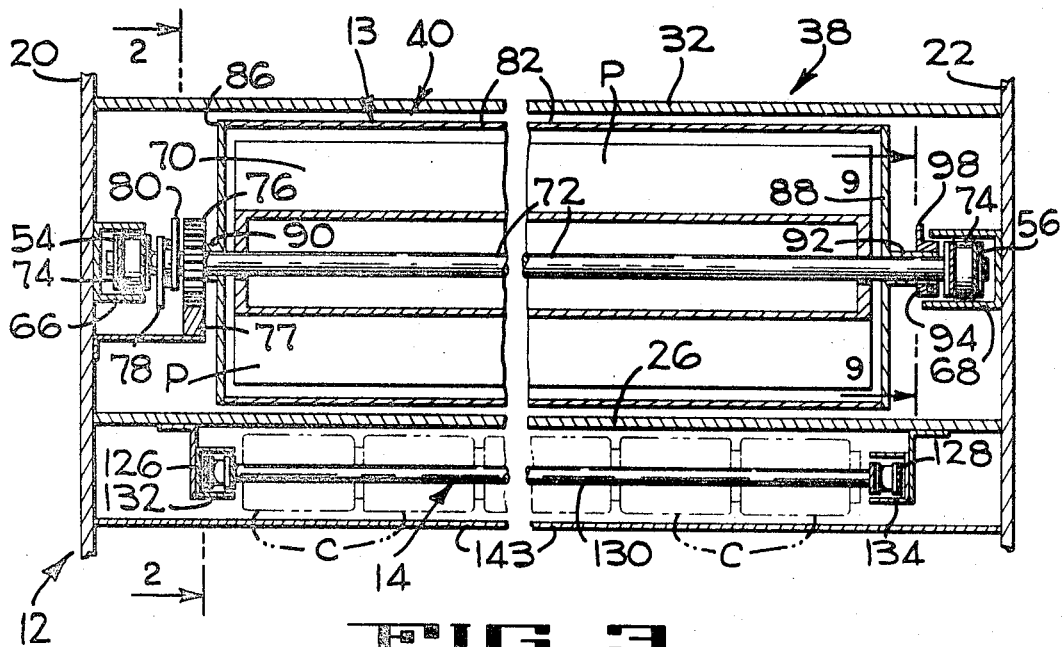

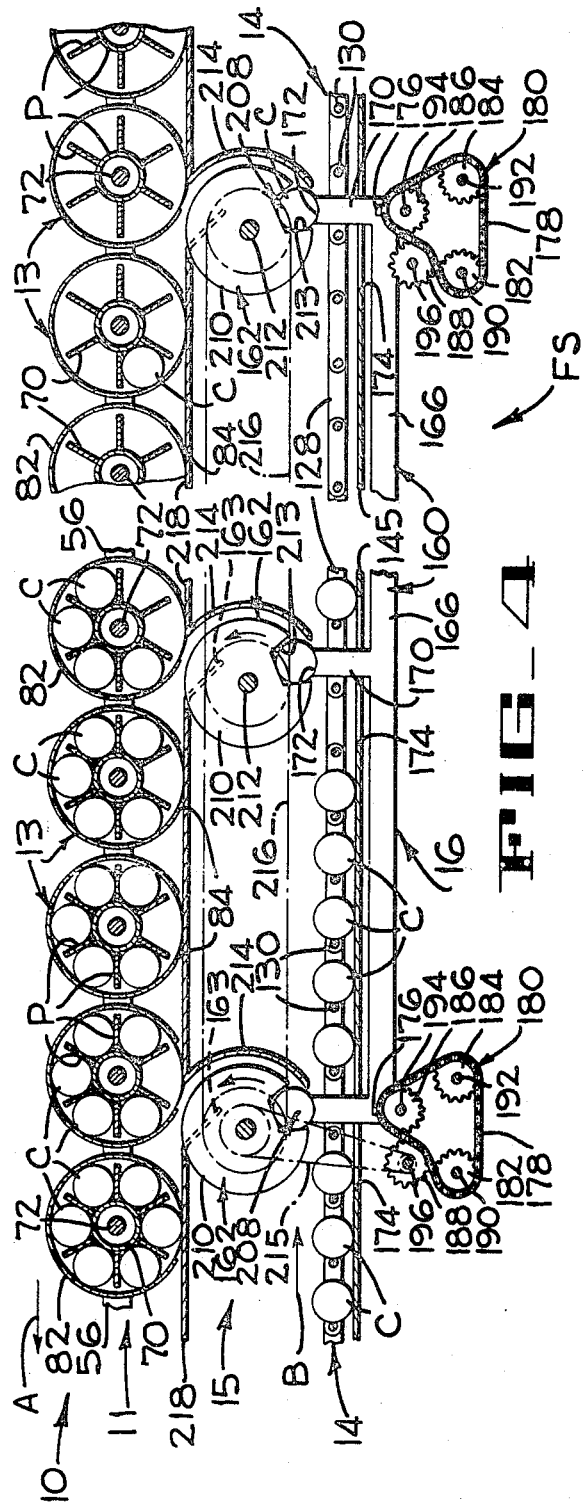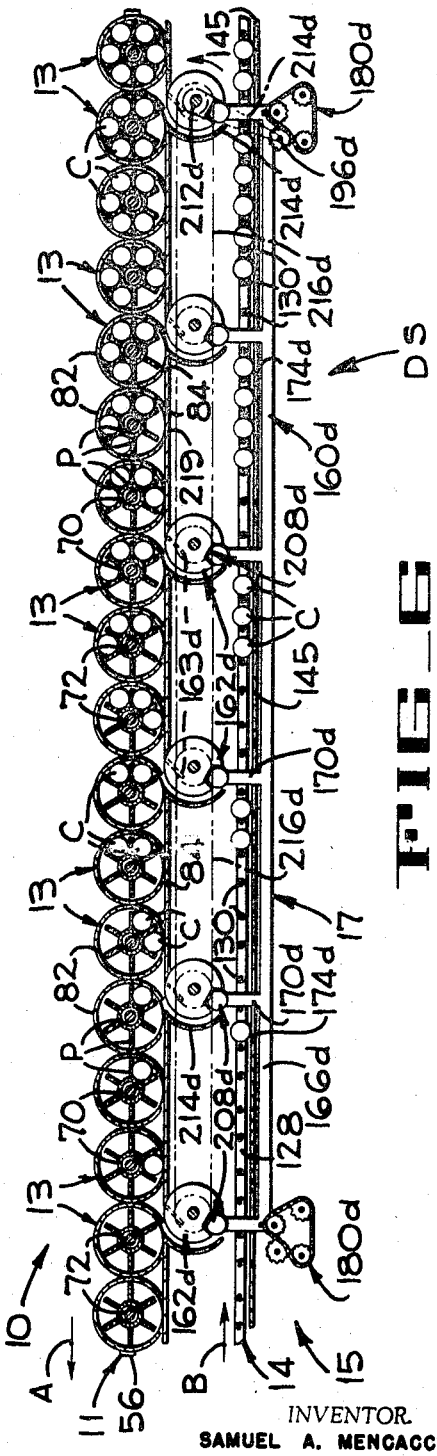

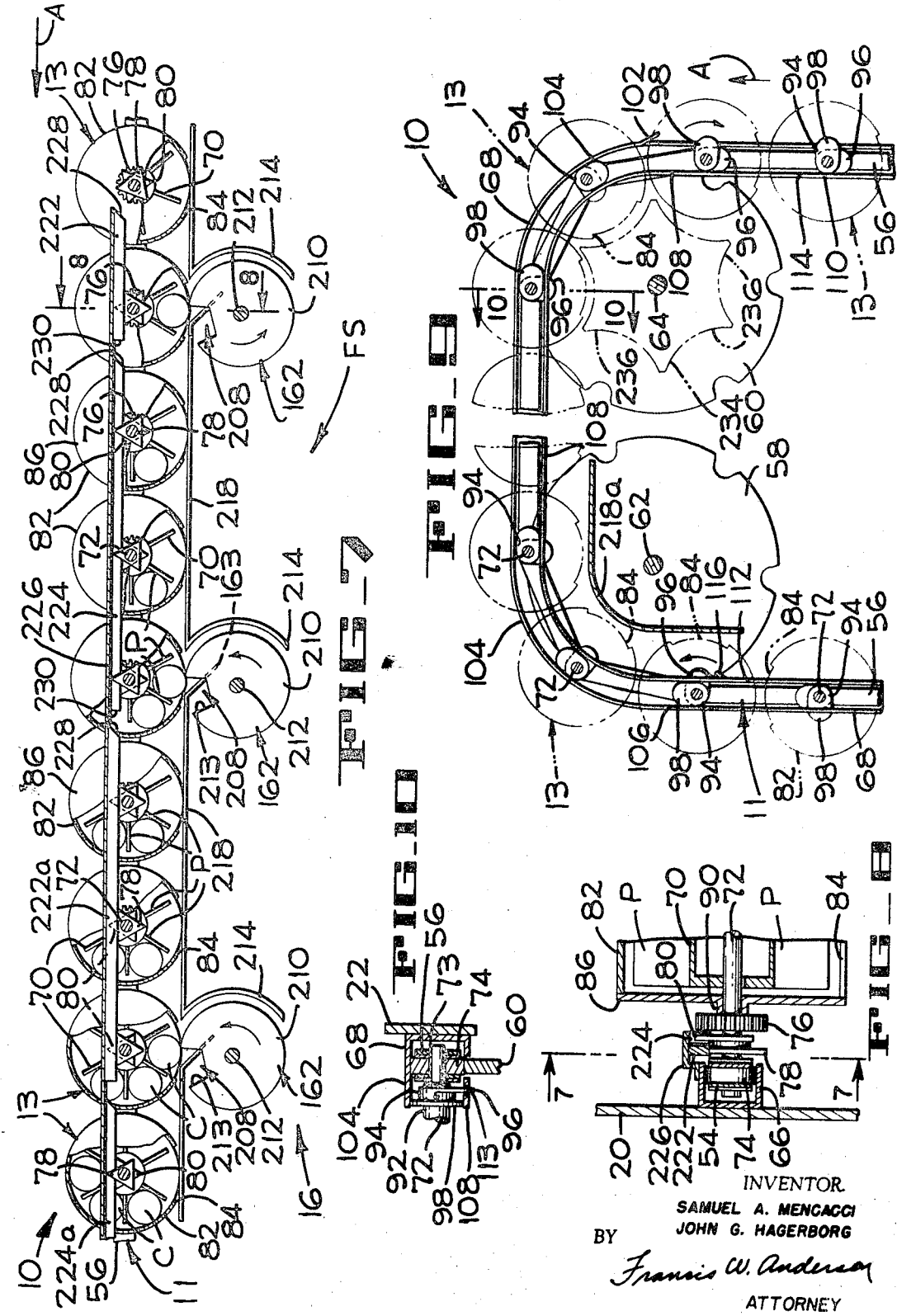

United States Patent Office 3,469,671
Patented Sept. 30, 1969

3,469,671
HYDROSTATIC COOKER CONVEYOR SYSTEM
Samuel A. Mencacci, Antwerp, and John G. Hagerborg, St. Niklaas-Waas, Belgium, assignors to International Machinery Corporation, S.A., St. Niklaas-Waas, Belgium, a corporation of Belgium
Filed Apr. 14, 1967, Ser. No. 631,049
Int. Cl. B65g 47/00
U.S. Cl. 198—25           9 Claims

ABSTRACT OF THE DISCLOSURE

A conveying system for a hydrostatic cooker including a continuously driven processing conveyor moving in one direction and having a plurality of evenly spaced multi-pocketed carriers thereon, and an endless bar conveyor that is continuously driven in the opposite direction for accommodating rows of containers and moving them between the upper and lower ends of the cooker. A container feed and discharge apparatus is associated with the conveyors for transferring the rows of containers between the bar conveyor and the pockets of the carriers when at the upper end of the cooker.

Background of the invention

This invention pertains to improved conveying systems for hydrostatic cookers and more particularly relates to an improved feed and discharge apparatus for multi-pocketed carriers of the processing conveyor of a hydrostatic cooker. The processing conveyor includes multi-pocketed agitating carriers of the type disclosed in our copending application Ser. No. 530,191, which application issued on Sept. 12, 1967, as Patent No. 3,340,791, and is assigned to the assignee of the present invention. The agitating carriers are arranged to receive rows of containers from a bar conveyor, and such rows, known in the art as sticks of containers, may be formed in rows of desired length and be transferred to the bar conveyor by apparatus such as that disclosed in Patent No. 3,067,850 which issued to John F. French on Dec. 11, 1962.

Processing conveyors for hydrostatic cookers which have a plurality of evenly spaced multi-pocketed carriers thereon are well known in the art but it has been especially difficult to feed rows of containers into and discharge rows of containers from such carriers. Since the processing conveyors in most hydrostatic cookers include several vertical runs, each of which is on the order of sixty feet tall, it is not feasible to intermittently drive the processing conveyor to permit the carrier loading and unloading operations to be performed when the carriers are stationary because the power requirements and wear on the heavily loaded processing conveyor would become excessive.

It will also be apparent that the carriers must enter and be discharged from the processing chambers of the cooker at the upper end thereof, and that any additional vertical runs externally of the processing chambers which extend downwardly to permit the carrier loading and unloading operation to occur at the lower level are expensive and considerably increase the wear to the chains of the processing conveyor.

Summary of the invention

The conveying system of the present invention includes an endless processing conveyor with multi-pocketed carriers thereon which are loaded and unloaded while continuously moving across the top of the cooker thereby eliminating the need for additional vertical runs of the processing conveyor for the purpose of allowing the loading and unloading operation to take place at lower levels. Rows of containers to be fed into the carriers are moved to the upper end of the cooker, and rows of processed containers that are discharged from the carriers after they have passed through the processing chambers, are moved to the lower end thereof by a bar conveyor which is continuously driven in a direction opposite to that of the processing conveyor. A transfer apparatus, which includes a feed mechanism and a discharge mechanism, is provided for transferring the rows of containers between the carriers and the bar conveyors.

Accordingly, it is an object of the present invention to provide an improved conveyor system for hydrostatic cookers which system includes a continuously driven processing conveyor having multi-pocketed carriers thereon which are loaded and unloaded when at the upper end of the cooker.

Another object is to provide a conveyor system which includes two continuously driven conveyors that move in opposite directions and also includes transfer means for transferring rows of containers from one conveyor to the other.

Brief description of drawings

FIGURE 1 is a diagrammatic elevation of the hydrostatic cooker employing the improved conveying system of the present invention, the central portion of the cooker being cut away.

FIGURE 2 is an enlarged vertical section taken substantially along the lines 2—2 of FIGURE 3.

FIGURE 3 is a horizontal section taken along lines 3—3 of FIGURE 2.

FIGURE 4 is an enlarged vertical section of a portion of the feed mechanism illustrating the manner in which the feed mechanism loads the carriers, the central portion of the feed mechanism being cut away.

FIGURE 5 is a perspective of a portion of the feed mechanism of FIGURE 4.

FIGURE 6 is a vertical section illustrating the discharge mechanism of the conveying system of the present invention.

FIGURE 7 is a vertical section of a portion of the feed mechanism taken substantially along the lines 7—7 of FIGURE 8 and illustrating the apparatus for indexing the pockets of the agitating carriers, certain parts of each carrier being cut away.

FIGURE 8 is an enlarged vertical section taken substantially along the lines 8—8 of FIGURE 7.

FIGURE 9 is a diagrammatic vertical section taken substantially along the lines 9—9 of FIGURE 3 and illustrating the camming mechanism at the upper end of cooker for shifting the carrier drums between a closed and an open container transfer position, the carrier drums being illustrated in phantom lines.

FIGURE 10 is an enlarged vertical section taken along lines 10—10 of FIGURE 9.

Description of preferred embodiment

The conveyor system 10 (FIG. 1) of the present invention comprises an endless processing conveyor 11 that is continuously driven in the direction of arrows A through the processing chambers of a hydrostatic cooker 12 and has a plurality of evenly spaced multi-pocketed carriers 13 thereon. An endless bar conveyor 14 is continuously driven in a direction opposite to that of the processing conveyor 11 as indicated by the arrows B and is trained around a path which is substantially parallel to that of the processing conveyor 11. The bar conveyor 14 carries rows of containers C to be processed to the upper end of the hydrostatic cooker 12 where a feed mechanism 15 of a container transfer apparatus 16 transfers the containers into the carriers as they moved therepast. After the rows of containers C have been processed by the cooker 12, they are transferred from the carrier 13 to the bar conveyor 14 by a discharge mechanism 17 of the transfer apparatus 16 for a movement to the lower end of the cooker where they are subsequently discharged.

The hydrostatic cooker 12 comprises a pair of vertically extending side walls 20 and 22 which are preferably spaced about eight feet apart. An inner wall 24 having short vertical portiton 26, an inclined portion 28 and a tall vertical portiotn 29 is welded in fluid tight engagement to the side walls 20 and 22. An outer wall 30 is also welded to the side walls 20 and 22 and is spaced from the inner wall 24 a distance slightly in excess of the diameter of the carriers 13 to permit movement of the processing conveyor 11 therethrough. The outer wall 30 includes a short vertical portion 32, an inclined portion 34 and a tall vertical portion 36. The walls 20, 22, 24 and 30 cooperate to define an open ended heat treatment chamber 38 which includes an inlet or preheating leg 40, a sterilizing leg 42, and a discharge or cooling leg 44. The chamber 38 is filled with water through a conduit 45 and the water in the sterilizing leg 42 is heated to sterilizing temperature by steam which enters the sterilizing leg at different points from the manifold 46. A pump P is connected to opposite ends of the sterilizing leg 42 by conduits 48 and 50 and serves to circulate the hot water in the sterilizing leg 42 in a direction opposite to the direction of movement of the carriers through the sterilizing leg.

Steam is also added to the inlet leg 40 as required so as to maintain a temperature gradient in the inlet leg which is below boiling at its upper end and is at approximately the sterilizing temperature at its lower end. Similarly, a temperature gradient is maintained in the discharge leg 44 by adding cold water thereto so that the temperature decreases from the sterilizing temperature at its lower end to a temperature somewhat below the boiling point of water at its upper end.

As indicated in FIGURES 1 and 3, the processing conveyor 11 includes a pair of spaced parallel endless chains 54 and 56 which are mounted on pairs of sprockets 58 and 60 (FIG. 1) that are keyed to shafts 62 and 64, respectively, journalled in the side walls 20 and 22. The chains 54 and 56 are guided through the cooker and past a feed station FS and discharge station DS by channel tracks 66 and 68 (FIG. 3), respectively, which are secured to the walls 20 and 22, respectively.

Each carrier 13 (FIGS. 2 and 3) comprises a pocketed star wheel 70 which is keyed to a shaft 72. As indicated in the drawings, six pockets P are the preferred number of pockets in each star wheel 70, and it will be understood that each pocket will accommodate a row of containers C which is about seven feet long.

The opposite ends of the shaft 72 of each carrier 13 are rotatably received within tubular bushings 73 (FIG. 10) which define the pivot pins for the links of the chains 54 and 56, and rollers 74 are journalled on the bushings and ride along the associated channel tracks 66 and 68. A pinion 76 keyed to the shaft 72 meshes with a rack 77 which is fixed within the processing chamber 38 and cause the star wheel 70 to rotate while passing through the chamber 38. A pair of equilateral triangles 78 and 80 (FIGS. 3 and 7) which lie in spaced vertical planes are also keyed to the shaft 72 for the purpose of rotating the reel 70 during the carrier loading and unloading operations as will be described in more detail later.

In order to maintaian the rows of cylindrical containers C within the pockets P of the reel 70 during their travel through the cooker, a cylindrical drum 82 having an elongated feed and discharge slot 84 therein is concentric with and positioned around the pocketed star wheel 70 in container confining relationship. Circular end plates 86 and 88 are welded to the ends of the drums 82 and include hubs 90 and 92 (FIG. 3), respectively, which are rotatably mounted on the shaft 72. A drum positioning cam 94 is keyed to the hub 92 and includes a main lobe 96 (FIG. 9) and a slot opening lobe 98. The lobe 96 is slidably received in the track 68 through a major portion of the travel of the carrier throughout its path of travel thereby holding the carrier feed and discharge slot 84 immediately adjacent a portion of the next adjacent carrier so that containers cannot pass through the slot 84.

As indicated in FIGURES 9 and 10, the movement of each carrier 13 into the discharge station DS causes the lobe 98 to strike an outwardly bent edge 102 of a wide flange extension 104 of the upper flange of the track 68 and causes the drum slot 84 to pivot 90° to the open position. The lobe 98 maintains the drum slot 84 in the open position until after the carrier 13 moves past both the discharge station DS and feed station FS by being guided by the flange extension 104 of the upper track flange which terminates at a point 106, and by a similar wide portion 108 of the lower flange of the track 68 which extends between points 110 and 112. During this time, the lobe 96 projects through a slot 113 in the lower flange, which slot begins at point 114 and terminates in a camming edge 116. The edge 116 engages the lobe 96 causing the drum to shift 90° to its closed position. The lobe 96 is then retained in this position by the flanges of the cam track 68 until it again shifts 90° upon engagement of the lobe 98 with the outwardly bent edge 102 of the outer flange of the cam track 68.

The bar conveyor 14 (FIGS. 1, 2 and 3) is provided in order to elevate rows of containers to be processed to the feed station FS at the upper end of the hydrostatic cooker 12, and to lower processed containers from the discharge station DS to the lower end of the cooker. Rows or sticks of containers are fed into the lower end of the bar conveyor 14 by a stick forming and feeding conveyor 124 of the type disclosed in Patent No. 3,067,850 which issued to John F. French, and processed sticks of containers are released upon a discharge conveyor 125 of well known design by the bar conveyor 14 for removal from the cooker.

The bar conveyor 14 comprises a pair of endless chains 126 and 128 (FIG. 3) having a plurality of evenly spaced container advancing bars 130 extending therebetween. The chains 126 and 128 are guided by channel tracks 132 and 134 (FIG. 3), respectively, which extend along substantially the entire path of movement of the conveyor 14. The chains 126 and 128 are trained around upper spaced pairs of sprockets 136 and 138 (FIG. 1) which are keyed to shafts 140 and 142, respectively, that are journalled in the side walls 20 and 22. Lower pairs of idler sprockets 141 are also provided for guiding the conveyor 14. One row or stick of containers C are retained between each adjacent pair of rods 130 by the inner wall 28 of the processing chamber 38, by vertical container retaining walls 143 and 144, and by a container support plate 145 (FIGS. 4 and 6) which is disposed below the feed and discharge runs of the bar conveyor 14 at the feed station FS and discharge station DS and include curved end portions 145a (FIG. 1) which are connected to the walls 143 and 144.

The processing conveyor 11 and bar conveyor 14 are continuously driven in opposite directions by a drive system 146 which receives its power from a motor M. A first chain drive 147 interconnects the motor M and the shaft 62 thereby continuously driving the processing conveyor 11 in the direction of the arrows A. A second chain drive 148 connects the motor to a gear box 150, which gear box drives other gear boxes 152, 153, 154 and 155 through interconnecting shafts 156. The output shaft of the gear box 155 is connected to the shaft 142 thereby continuously driving the bar conveyor 14 in a direction opposite to that of the processing conveyor 11 as indicated by arrows B. The gear boxes 150 and 152 drive the feed mechanism 15, while the gear boxes 153 and 154 drive the discharge mechanism 17. Thus, the processing conveyor 11, the bar conveyor 14, the feed mechanism 15 and the discharge mechanism 17 are all driven in timed relation by the motor M.

The feed mechanism 15 (FIGS. 1, 4, 5 and 7) comprises the bar conveyor 14 which continuously advances the rows of containers across the container supporting plate 145, and elevator 160 which raises spaced rows off the plate 145, transfer reels 162 which receive the rows of containers from the elevator 160, and stripping fingers 163 which strip the containers from the reel 162 and transfer them into associated pockets P of the carriers 13.

The elevator 160 comprises a generally rectangular frame 166 having a series of transversely extending lifting bars 168 (only one bar being shown in FIG. 5) welded thereto, which lifter bars correspond in number to the number of pockets P in the carriers 13, the preferred number being six, and also are spaced apart a distance sufficient to permit a number of rows of containers equal to that of the number of pockets P to be placed therebetween as indicated in FIGURES 1 and 4. A plurality of spaced groups of lifting fingers 170 (FIG. 5) having V-shaped upper edges 172 for cradling a row of containers C in each group are welded to each lifting bar 168 and are adapted to project upwardly through slots 174 in the plate 145 as illustrated in FIGURES 4 and 5.

Each of the four corners of the rectangular frame 166 is connected by an angle bracket 176 to the chain 178 of an elevator lifting mechanism 180. The chain 178 of each elevator lifting mechanism 180 is trained around sprockets 182, 184, 186 and 188 which sprockets are keyed to stub shafts 190, 192, 194, and 196, respectively. The shafts are journalled in the adjacent wall 20 or 22, and chain and sprocket drive 198 (FIG. 1) connects the two left hand (FIG. 1) lifting mechanisms 180 to a transversely extending output shaft 200 which is coupled to the gear box 150, while similar chain and sprocket drives 202 connect both right hand (FIG. 1) lifting mechanisms 180 to a transversely extending output shaft 204 which is coupled to the gear box 152. It will be understood that the shafts 200 and 204 extend completely across the cooker 12, and that they drive the upper V-shaped edges 172 of each group of lifting fingers 170 in a clockwise direction from the uppermost position shown in FIGURE 4 to a position below the plate 145 along paths which are similar in shape to the path of movement of the chains 178. It will also be understood that the rate of movement of each group of lifting fingers 170 is such that as each group moves upwardly between a pair of bars 130 on the bar conveyor 14, the group of fingers will engage and lift the associated row of containers from between the bars and transfer them into a pocket 208 in the associated transfer reel 162 and thereafter return to a position below the plate 145 without contacting either of the adjacent bars 130. It will also be understood that during movement of each group of lifting fingers 170 of the preferred embodiment of the invention through one complete cycle of operation that the bar conveyor 14 will move six bars 130 past the fingers 170 so that each of the six groups of fingers will engage every sixth row of containers.

As indicated in FIGURE 4, when each group of lifting fingers 170 is in its uppermost position, it lifts a row of containers into the pocket 208 of the associated transfer reel 162. Each transfer reel 162 (FIGS. 4, 5 and 7) comprises a series of spaced discs 210 keyed to a shaft 212. Each disc 210 has a container accommodating slot 213 in its periphery which is aligned with similar slots in other discs to define the aforementioned container accommodating pocket 208. An arcuate plate 214 is curved around a portion of the transfer reel 162 and retains the containers in the associated pocket 208 until stripped therefrom by the associated stripper fingers 163.

As illustrated in FIGURE 4, one of the transfer reels 162 is driven one revolution for each complete cycle of operation of the elevator 160 by means of a chain and sprocket drive 215 interconnecting the shafts 196 and 212. The other transfer reels in the feed mechanism 15 are driven in the same direction and at the same speed by chain and sprocket drives 216 which interconnect each transfer reel 162 to the next adjacent transfer reel. Thus, in the preferred embodiment of the invention, six rows of containers C are simultaneously lifted by the elevator 160 into the pockets 208 of the associated transfer reel 162. Rotation of each transfer reel 162 in a counterclockwise direction (FIG. 4) then move the six rows of containers upwardly within the associated arcuate guide 214, which six rows are then stripped from their associated pockets 208 by the associated groups of stripper fingers 163 which are inclined downwardly between the discs 210 as indicated in FIGURE 5.

The groups of stripper fingers 163 associated with each transfer reel 162 are formed on one end of horizontal guide plates 218 which are secured to the side walls 20 and 22 and are disposed immediately below the portion of the processing conveyor 11 in the feed station FS. Similar guide plates 219 (FIG. 1) are disposed in the discharge station DS with the end plates 218a and 219a being curved downwardly and connected to the wall 26 and 29, respectively. As the rows of containers are stripped out of their associated pockets 208, they are each advanced into an empty pocket P through the feed and discharge slot 84 in the drum 82 of an associated carrier 13 while the carrier is being continuously moved therepast by the processing conveyor 11.

In order to assure that an empty pocket P of each carrier 13 is disposed in position to receive a row of containers from each of the six groups of stripping fingers 163, it will be understood that each carrier star wheel 70 must be rotated to index one pocket P at a time into container receiving position each time the carrier 13 moves past one of the six groups of stripper fingers 163. The aforementioned equilateral cam triangles 78 and 80 (FIGS. 7 and 8) are provided for this purpose and cooperate with a series of stationary cam bars 222, 222a and 224, 224a, respectively. The cam bars 222, 222a are disposed in planar alignment with the triangle 78 while the cam bars 224, 224a are disposed in planar alignment with the triangle 80. The cam bars 222 and 224 are welded to a bracket 226 which are secured to the channel cam track 66 as shown in FIGURE 8. It will be understood that a total of six cam bars 222 and 224 are provided at the feed station FS and six similar bars are provided at the discharge station DS, one bar being provided for each group of stripper fingers 163, and that each bar has a beveled leading edge 228 and a trailing edge 230 which terminates prior to the leading edge of the next adjacent bar. The bars 222 and 224 are mounted on the bracket 226 in staggered relation so that as the conveyor 11 moves each empty carrier 13 in the direction of the arrows A, the triangle 78 will first engage the sloping edge 228 of the bar 222 causing the carrier star wheel 70 to rotate to a position wherein one of the pockets P opens vertically downward in alignment with the drum slot 84. A flat surface of the triangle 78 then slides along an edge of the bar 222 until after the lowermost pocket P is loaded with a row of containers and the triangle 78 is advanced past the trailing edge 230 of the cam bar 222. The triangle 80 then engages the beveled leading edge 228 of the cam bar 224 thus rotating the carrier star wheel 70 through an arc of 60 degrees causing another empty pocket P to be indexed downwardly into alignment with the slot 84 in the carrier drum 82 and at the same time lifting the first row of containers to a confined position within the drum 82. The carrier star wheel 70 is maintained in this position by slidable engagement of a flat surface of the triangle 80 with an edge of the bar 224 until another row of containers has been moved into the empty pocket P and the triangle 80 moves off the trailing edge 230 of the bar 224 at which time the triangle 78 engages the beveled edge 228 of the bar 222a thereby shifting a new empty pocket into position to be filled. The above operation is repeated until all six pockets P of each carrier 13 are filled and the filled carriers have been advanced out of the feed station FS. It will be noted the cam tracks 222 and 224 are arranged so that the cams will shift the carrier star wheels 70 shortly after a pocket has been filled thereby avoiding excessive sliding engagement of the row of containers with the plates 218.

With each carried filled in this manner, the carriers are moved around tthe curved end plate 218a (FIG. 1) at which time the lobe 96 (FIG. 9) engages the outwardly bent camming edge 116 of the channel cam track 68 thereby shifting the drum 82 of each carrier through an arc of 90 degrees in a counterclockwise direction causing the feed and discharge slot 84 to move upwardly to a block position immediately adjacent the following carrier. The drum controlling lobe 96 then rides between the flanges of the channel track 68 thereby holding the drum slot 84 immediately adjacent the drum of the next adjacent carrier until after the carriers have been moved through the processing chamber 38 (FIG. 1) of the hydrostatic cooker 12. Upon reaching the upper end of the discharge leg 44 of the processing chamber 38, the lobe 98 engages the outwardly bent camming edge 102 (FIG. 9) of the channel cam track 56 thereby shifting the drum 82 of each carrier through an arc of 90 degrees in a clockwise direction thereby moving the drum to the open position.

In order to prevent the possibility of containers falling out of the carriers 13 as the drum 82 is shifted to the open position, the arcuate portion of the plate 219a (FIG. 1) adjacent the sprockets 60 is cut away to receive an elongated star retainer 234 (FIG. 9) which is keyed to the shaft 64. The star retainer 234 includes six equally spaced concave side walls 236 which extend the full length of the drum slots 84 and effectively seals the slots when the drum is being rotated to the open position.

The discharge mechanism 17 (FIGS. 1 and 6) is substantially the same as the feed mechanism 15 except that it operates to lower processed rows of containers from the carriers 13 to the bar conveyor 14 rather than to feed conveyors from the bar conveyor 14 to the carriers 13. Accordingly, the discharge mechanism 17 will not be described in detail and only the differences between the discharge mechanism 17 and the feed mechanism 15 will be described in detail. Parts of the discharge mechanism 15 which are equivalent to those in the feed mechanism 15 will be assigned the same numerals followed by the letter d.

The loaded carriers 13 with the drum slots 84 (FIG. 6) disposed in their open positions as illustrated in FIGURE 6, advance the lowermost rows of containers at the discharge station DS across the associated plates 219a and 219 for gravitational discharge down the associated groups of inclined fingers 163d for acceptance in the pockets 208d of the associated transfer discharge reels 162d. The first transfer reel 162d is driven in a counterclockwise direction (FIG. 6) by a chain drive 214d that is connected between the shafts 196d and 212d. The other discharge reels 162d are driven at the same speed and in the same direction by chain drives 216d which connect each reel to the next adjacent reel.

The rows of containers C are retained in their pockets 208d by arcuate guides 214d until they are received in the V-shaped upper ends of the associated groups of transfer fingers 170d that are supported on the frame 166d of the elevator 160d. The four corners of the frame 166d are connected to elevator lifting mechanisms 180d (only two being shown) which are driven by chain drives 198d and 202d (FIG. 1) respectively, that are connected to the gear boxes 153 and 154 by transversely extending output shafts 200d and 204d, respectively. The fingers 170d (FIG. 6) of the elevator 160d project through slots 174d in the plate 145 and lower the six rows of containers onto the plate 145 between associated bars 130 of the bar conveyor 14. The fingers 170d then move below the plate 145 and subsequently move upwardly to complete their cycle of operation and to accept other rows of containers C from the six pockets 208d of the six transfer reels 162d. This operation is repeated until all rows of containers C in each carrier 13 has been discharged therefrom and has been placed between associated bars 130 of the bar conveyor 14. The bar conveyor 14 (FIG. 1) then moves the processed rows of containers to the lower end of the hydrostatic cooker 12 where they are discharged onto the discharge conveyor 125 for removal from the hydrostatic cooker.

During unloading of each carrier, it will be understood that the carrier start wheels 70 are rotated in 60 degree increments each time they move past one of the transfer reels 162d by the triangular cams 78 and 80 (FIG. 8) which alternately engage cam bars 222 and 224 which are supported at the discharge station in a manner quite similar to that of the feed station FS.

Although the operation of the hydrostatic cooker conveying system 10 of the present invention has been included in the detailed description of the system, a brief resume of the operation will follow.

Rows of containers C to be processed are moved along a linear path adjacent the lower end of the hydrostatic cooker 12 (FIG. 1) by the feed and stick forming conveyor 124 and are transferred between adjacent bars of the bar conveyor 14 for movement in the direction of the arrows B to the upper end of the hydrostatic cooker. The bar conveyor 14 then continuously advances the rows of containers across the plate 145 (FIG. 4) into the feed station FS. Spaced rows of these containers are then engaged and are lifted by the elevator 160 into the six pockets 208 of the six transfer reels 162 which, with the aid of the stripper fingers 163 move the six rows of containers into associated pockets P of carriers 13. The continuously moving processing conveyor 11 then moves the carriers 13 that have had their lowermost pockets P loaded away from the associated transfer reels 162 at which time the carrier star wheels 70 of each of said six carriers is rotated 60 degrees in response to engagement of the triangle cams 78 or 80 (FIG. 8) with the associated camming bars 222 or 224. The next six adjacent downstream carriers 13 with their lowermost pockets empty are then moved into position to receive the next six rows of containers from the transfer reels 162. This cycle of operation is repeated until each and every pocket in all of the carriers 13 are filled and the carriers are moved out of the feed station FS.

The conitnuously moving processing conveyor 11 then moves the completely filled carriers downwardly past the camming edge 116 (FIG. 9) of the channel cam track 68 thereby causing the drum 82 of each carrier to shift 90 degrees in a counterclockwise direction to the closed position. The processing conveyor 11 then advances the carriers 13 through the processing chamber 38 during which time the pinions 76 (FIG. 2) engages the rack 77 which is fixed within the chamber 38 and accordingly rotates the reel 70 of each carrier thereby agitating the containers and their contents.

After the containers C have been processed and have been moved upwardly out of the discharge leg 44 of the processing chamber 38, the lobe 98 (FIG. 9) engages the camming edge 102 of the cam track 68 thereby shifting the drum 82 of each carrier in a clockwise direction through an arc of 90 degrees to an open position. During this time containers are prevented from falling through the drum slot 84 by one of the arcuate surfaces 236 of the star retainer 234. Continued movement of the carriers advances the lowermost rows of containers across the plates 219a and 219 (FIG. 6) at the discharge station DS and into associated pockets 208d of the associated transfer reels 162d. The six transfer reels 162d discharge their rows of containers onto the six upstanding groups of fingers 170d of the elevator 160d which subsequently lowers the rows of containers onto the plate 145 between bars 130 of the bar conveyor 14.

Each time a row of containers is discharged from the lower pocket P of one of the carriers 13 into the associated pocket 208d of the associated transfer reel 162d, continued advancement of the carrier 13 causes the triangle cam 78 or 80 (FIG. 8) associated therewith to engage one of the cam bars 226 or 224 thereby rotating the carriers star wheel 70 in a clockwise direction to position another full pocket P lowermost so that the row of containers therein will be discharged into the next downstream pocket 208d. The above discharge operation is repeated until each of the six pockets in each carrier 13 is empty and the rows of containers therein have been placed in the bar conveyor 14. The bar conveyor then moves the rows of processed containers from the upper end of the cooker downwardly for discharge therefrom onto the discharge conveyor 125 (FIG. 1) which removes the processed rows of containers from the hydrostatic cooker 12. The empty carriers 13 are then moved into the feed station FS where the above cycle of operation is repeated.

From the foregoing description it will be apparent that the hydrostatic cooker conveyor system of the present invention includes a bar conveyor and a processing conveyor both of which are continuously driven in opposite directions, the bar conveyor being provided for moving rows of containers between the lower end of the hydrostatic cooker and the upper end of the cooker so that the length of the processing conveyor can be at a minimum. The conveyor system also includes transfer means disposed between the two conveyors which transfers the rows of containers between the bar conveyor and multipocketed carriers on the processing conveyor.

Although the best mode contemplated for carrying out the present invention has been herein shown and described, it will be apparent that modification and variation will be made without departing from what is regarded to be the subject matter of the invention as set forth in the appended claims.

Having completed a detailed description of the invention so that those skilled in the art may practice the same, we claim:

1. A conveyor system for a cooker having a processing chamber comprising: a continuously driven first conveyor for advancing rows of containers between an upper portion of the cooker above the processing chamber and a lower portion of the cooker; a continuously driven second conveyor having a linear portion disposed advacent a linear portion of said first conveyor; a plurality of evenly spaced multi-pocketed agitating carriers on said second conveyor; means for transferring containers between said first conveyor and the carriers of said second conveyor while both conveyors are continuously driven; each of said carriers including a shaft rotatably supported by said second conveyor, a star wheel rigid with said shaft and having a plurality of equally spaced pockets formed on its periphery, a drum rotatably mounted on said shaft and having a slot therein for receiving and discharging rows of containers when moved to an open position; cam means for moving said slot to a closed position immediately adjacent the drum of another carrier when said carriers are moving through the processing chamber and for moving the slot to an open position when said carriers are moving through a feed and discharge station; and means for intermittently rotating the star wheel of each carrier when the carriers are moving through said feed and discharge stations.

2. An apparatus according to claim 1 wherein said carriers move over a container supporting plate having a plurality of equally spaced openings therein each defined by downwardly projecting fingers at one edge and an arcuate retainer at the other edge, the number of openings being the same as the number of pockets, a transfer reel associated with each opening and having a transfer pocket therein for receiving a row of containers, a vertically movable lifting means associated with each transfer pocket for transferring a row of containers between a transfer pocket and said first conveyor, and means for rotating each transfer reel and for driving each lifting means in timed relation with the movement of both of said conveyors for effecting the transfer of rows of containers between said pockets and said second conveyor.

3. An apparatus according to claim 1 and additionally comprising means in the processing chamber for rotating said star wheels within said drums while the carriers are being moved through the processing chamber.

4. A conveyor system for a cooker having a processing chamber comprising, a continuously driven first conveyor for advancing rows of containers between an upper portion of the cooker above the processing chamber and a lower portion of the cooker, a continuously driven second conveyor having a linear portion disposed adjacent a linear portion of said first conveyor, a plurality of evenly spaced multi-pocketed carriers on said second conveyor, means for transferring containers between said first conveyor and the carriers of said second conveyor while both conveyors are continuously driven, said carriers being moved over a container supporting plate having a plurality of equally spaced openings therein each defined by downwardly projecting fingers at one edge and an arcuate retainer at the other edge, the number of openings being the same as the number of pockets, a transfer reel associated with each opening and having a transfer pocket therein for receiving a row of containers, a vertically movable lifting means associated with each transfer pocket for transferring a row of containers between a transfer pocket and said first conveyor, and means for rotating each transfer reel and for driving each lifting means in timed relation with the movement of both of said conveyors for effecting the transfer of rows of containers between said carrier pockets and said second conveyor.

5. A conveyor system for a cooker having a processing chamber comprising: a continuously driven first conveyor for advancing rows of containers between an upper portion of the cooker above the processing chamber and a lower portion of the cooker; a continuously driven second conveyor having a linear portion disposed adjacent a linear portion of said first conveyor; a plurality of evenly spaced multi-pocketed agitating carriers on said second conveyor; means for transferring containers between said first conveyor and the carriers of said second conveyor while both conveyors are continuously driven; said linear portions of said conveyors being driven in opposite directions and said transferring means simultaneously transferring a plurality of rows of containers between said first conveyor and said second conveyor; each of said carriers including a shaft rotatably supported by said second conveyor, a star wheel rigid with said shaft and having a plurality of evenly spaced pockets formed on its periphery, a drum rotatably mounted on said shaft and having a slot therein for receiving and discharging rows of containers when moved to an open position; cam means for moving said slot to a closed position immediately adjacent the drum of another carrier when said carriers are moving through the processing chamber and for moving the slot to an open position when said carriers are moving through a feed and discharge station; and means for intermittently rotating the star wheel of each carrier when the carriers are moving through said feed and discharge stations.

6. An apparatus according to claim 5 wherein said carriers move over a container supporting plate having a plurality of evenly spaced openings therein, each defined by downwardly projecting fingers at one edge and an arcuate retainer at the other edge, the number of openings being the same as the number of pockets, a transfer reel associated with each opening and having a transfer pocket therein for receiving a row of containers, vertically movable lifting means associated with each transfer pocket for transferring a row of containers between a transfer pocket and said first conveyor, and means for rotating each transfer reel and for driving each lifting means in timed relation with the movement of both of said conveyors for effecting the transfer of rows of containers between said carrier pockets and said conveyor.

7. An apparatus according to claim 6 and additionally comprising means in the processing chamber for rotating said star wheels within said drums while the carriers are being moved through the processing chamber.

8. An apparatus according to claim 7 wherein said linear portions of said conveyors are horizontal and are moving in opposite directions.

9. A conveyor system for a cooker having a processing chamber comprising, a continuously driven first conveyor for advancing rows of containers between an upper portion of the cooker above the processing chamber and a lower portion of the cooker, a continuously driven second conveyor having a linear portion disposed adjacent a linear portion of said first conveyor, a plurality of evenly spaced carriers on said second conveyor, and means for transferring containers between said first conveyor and the carriers of said second conveyor while both conveyors are continuously driven, said linear portions of said conveyors being horizontal and being moved in opposite directions.

References Cited

UNITED STATES PATENTS 2,765,897  10/1956  Vamvakas _____ 198—25

FOREIGN PATENTS 797,370  7/1958  Great Britain.

EDWARD A. SROKA, Primary Examiner

U.S. Cl. X.R.

99—360

PO-1050
(5/69)

UNITED STATES PATENT OFFICE
CERTIFICATE OF CORRECTION

Patent No. 3,469,671          Dated September 30, 1969

Inventor(s) SAMUEL A. MENCACCI ET AL

It is certified that error appears in the above-identified patent and that said Letters Patent are hereby corrected as shown below:

Column 3, line 8:    change "portiton" to --portion--;

Column 3, line 9:    change "portiotn" to --portion--;

Column 3, line 66:   change "maintaian" to --maintain--.

Column 7, line 8:    change "carried" to --carrier--;

Column 7, line 9:    change "tthe" to --the--.

Column 9, line 39:   change "inventiton" to --invention--;

Column 9, line 49:   change "advacent" to --adjacent--.

SIGNED AND SEALED
FEB 9 1971

(SEAL)
Attest:

Edward M. Fletcher, Jr.
Attesting Officer

WILLIAM E. SCHUYLER, JR.
Commissioner of Patents